(No Model.)
C. NEWHALL.
JOURNAL BEARING FOR LAWN MOWERS.
No. 386,082.　　　　　　　　　Patented July 10, 1888.
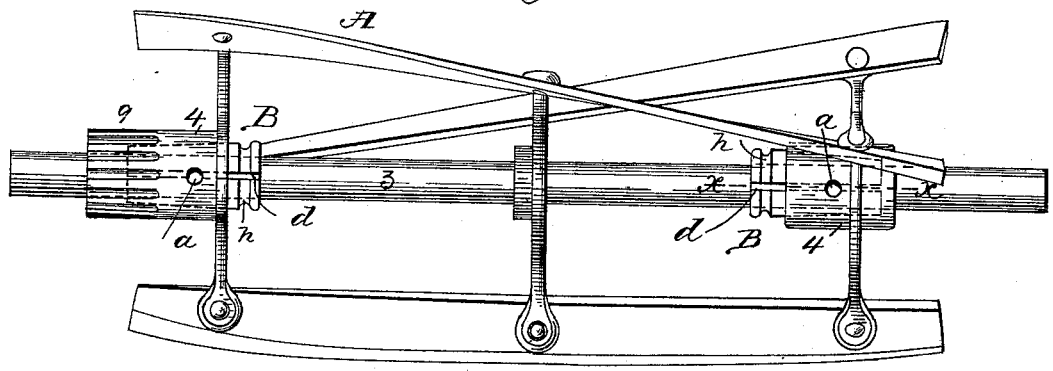
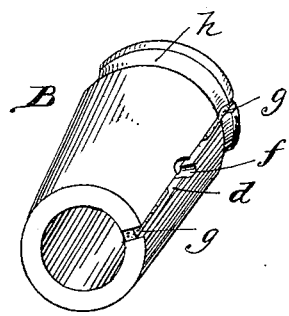
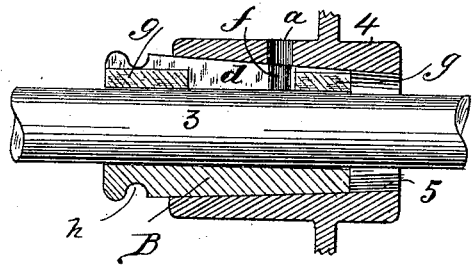
Witnesses.
Wm. S. Bellows
G. W. Chamberlain.
Inventor,
Cyrus Newhall,
By his Attorneys,

UNITED STATES PATENT OFFICE.

CYRUS NEWHALL, OF HINSDALE, NEW HAMPSHIRE, ASSIGNOR OF ONE-HALF TO LORENZO STEBBINS, OF SAME PLACE.

JOURNAL-BEARING FOR LAWN-MOWERS.

SPECIFICATION forming part of Letters Patent No. 386,082, dated July 10, 1888.

Application filed March 17, 1888. Serial No. 267,558. (No model.)

*To all whom it may concern:*

Be it known that I, CYRUS NEWHALL, a citizen of the United States, residing at Hinsdale, in the county of Cheshire and State of New Hampshire, have invented new and useful Improvements in Journal-Bearings for Lawn-Mowers, of which the following is a specification.

This invention relates to improvements in lawn-mowers, particularly applicable to that class thereof described in the Letters Patent granted to me June 20, 1882, No. 259,904, the object whereof being to secure an improved and more efficient bearing between the main axle or shaft and the knife-frame or cutting-cylinder rotatable thereon; and it consists in the construction and combination of parts, as will hereinafter more fully appear, and be set forth in the claims.

Reference is to be had to the accompanying drawings, in which similar characters of reference indicate corresponding parts in all the views.

Figure 1 is a side view of the knife-frame or cutting-cylinder mounted upon the axle or main shaft, having the improved bearings applied thereto. Fig. 2 is a longitudinal section in detail on line $x\ x$, Fig. 1, and Fig. 3 is a perspective view of the bearing plug or box to be hereinafter referred to.

In the drawings, A represents the knife-frame or cutting-cylinder comprising the axial hollow hubs 4, on one of which are formed gear-teeth 9, to constitute a pinion by which a rotary motion may be imparted to said knife-frame independent of and upon the main shaft or axle 3, to which the traction-wheels are to be connected in the manner substantially as set forth in the said patent.

Each hub 4 has a bore, 5, tapering from its inner to its outer end, and through the wall of each hub is an oiling-hole, *a*, and within the tapering bore of each hub 4 is inserted a tubular bearing box or plug, B, having a longitudinally-tapering outer wall and an internal bore of uniform diameter corresponding with the diameter of said shaft 3. One wall of each bearing-plug B has therein a longitudinal scarf or split of a desired width, as seen at *d*, whereby said tubular plug is more or less elastic or contractible circumferentially, and at a point along said scarf or other portion of the wall of the tubular plug is an oil-hole, *f*. Within the said scarf, at each end thereof, are placed short strips *g*, of wood or other similar material which is of a slightly-compressible nature, and each plug B, at its inner or larger end, is provided with an annular groove, *h*, as shown.

The bearing-plugs are to be driven into the tapering hub-bores for such a distance as to secure their contraction about the shaft 3 for the desired closeness and of bearing to permit the requisite freedom of rotation of the one upon the other, with the hole *f* of said plug about opposite the oil-receiving hole *a* of the hub. The wearing of the shaft or of the inside of the plug B is taken up by driving the said plug endwise farther into the tapered hub-bore, securing its further contraction to correspond with the worn diameter of the shaft.

The strips of wood, *g*, prevent the escape of the oil entered through the oil-hole *a* to the shaft along the scarf *d*, and said strips are capable of being compressed under the contraction of the walls of the tubular plug, and also in a measure serve to secure a uniform contraction of said walls. The hole or enlargement *f* through the wall of the plug may be dispensed with, as the scarf *d*, when ranged opposite the oil-hole *a* of the hub, will serve as a sufficient oilway to the shaft at all times except when the wear of the parts has been so great that in taking up such wear the scarf-opening has become closed. When desired to replace one wear-plug in a hub with another, the same may be withdrawn, the provision of the groove *h* affording a means for securing a grip upon the end of said plug.

What I claim as my invention is—

1. A journal or wear box consisting of a tubular plug having a tapering outer wall and a longitudinal scarf, *d*, combined with the strips *g* of compressible material, substantially as and for the purpose described.

2. A journal or wear box consisting of a tubular plug having a tapering outer wall and a longitudinal scarf, *d*, and the hole or enlargement *f* through the walls of the plug, substantially as described.

3. The combination, with the driving-shaft 3 and the frame provided with the hubs 4, having the tapering bores 5 and the oil-holes $a$, of the tubular plugs, each having a tapering outer wall provided with the longitudinal scarf $d$, ranged across one of said oil-holes $a$, and the strips $g$, of compressible material, in the ends of said scarf, substantially as and for the purpose described.

4. The combination, with the driving-shaft and the frame provided with the hubs 4, having the tapering bores 5 and the oil-holes $a$, of the tubular plugs, each having a tapering outer wall provided with the longitudinal scarf $d$, ranged across one of said oil-holes, and having the annular groove $h$ and the strips $g$, of compressible material, in the ends of said scarf, substantially as shown and described.

CYRUS NEWHALL.

Witnesses:
CHAS. D. WHITAKER,
RINALDO G. GILLMORE.